(12) United States Patent
Kozora

(10) Patent No.: US 6,907,756 B2
(45) Date of Patent: Jun. 21, 2005

(54) PLUNGER FOR BOTTLE FORMING I.S. MACHINE

(76) Inventor: Joseph W. Kozora, 126 Whitaker La., Saxonburg, PA (US) 16056

( * ) Notice: Subject to any disclaimer, the term of this patent is extended or adjusted under 35 U.S.C. 154(b) by 416 days.

(21) Appl. No.: 10/281,918

(22) Filed: Oct. 28, 2002

(65) Prior Publication Data

US 2004/0079117 A1 Apr. 29, 2004

(51) Int. Cl.$^7$ ................................................. C03B 9/14
(52) U.S. Cl. ................................ 65/362; 65/261; 65/263
(58) Field of Search ............................... 65/68, 72, 77, 65/78, 81, 233, 234, 261, 263, 362

(56) References Cited

U.S. PATENT DOCUMENTS

| | | | | |
|---|---|---|---|---|
| 5,358,543 A | | 10/1994 | Kozora | 65/319 |
| 5,407,457 A | * | 4/1995 | Barbier et al. | 65/68 |
| 5,411,564 A | * | 5/1995 | Bolin | 65/68 |
| 5,876,475 A | | 3/1999 | Kozora | 65/68 |
| 6,497,120 B1 | | 12/2002 | Kozora | 65/362 |
| 2003/0230115 A1 | * | 12/2003 | Pessoa | 65/68 |

* cited by examiner

Primary Examiner—Sean Vincent
(74) Attorney, Agent, or Firm—The Webb Law Firm

(57) ABSTRACT

A plunger for use in forming parisons during the manufacture of glass containers having a biased open valve therein.

8 Claims, 5 Drawing Sheets

PLUNGER FOR BOTTLE FORMING I.S. MACHINE

BACKGROUND OF THE INVENTION

1. Field of the Invention

The present invention is directed to a plunger for use in forming parisons during the manufacture of glass containers with individual section (I.S.) machines.

2. Description of Related Art

A well-established process for manufacturing glass containers is known as the "blow-and-blow" process. In the "blow-and-blow" process, a gob of molten glass is introduced and partially shaped or molded into an object called a parison, which eventually will be formed into a glass container. The parison is formed by a blowing operation in a mold. The gob is introduced into the mold positioned over a plunger which acts to form the neck region of the parison. A vacuum is provided below the gob to urge the gob into the neck and around the plunger. The plunger is then withdrawn creating a space into which air is blown to expand the gob to the shape of the mold cavity. Thereafter, the shaped gob or parison is transferred to a finishing mold for a further blowing operation to form the parison into a container. Details of a suitable mechanism for plunger cycling are disclosed, for example, in U.S. Pat. No. 5,358,543 entitled "Air Tube Structure in a Glass Container Forming Machine". The details of a suitable mechanism for connecting either a vacuum or blowing air to a piston for transfer through the plunger to the blank mold is described in U.S. Pat. No. 5,876,475 entitled "Glass Container Forming Process and Equipment". Both of these patents are incorporated herein by reference.

SUMMARY OF THE INVENTION

Briefly, according to the present invention, there is provided a plunger for being attached to a piston that inserts and withdraws the plunger from the neck region of a blank mold during the manufacture of a parison for forming glass containers in the blow-and-blow process. The plunger comprises a hollow cylindrical body, the lower end of which engages the piston. A radial flange extends from the exterior of the cylindrical body, preferably spaced from the lower end of the hollow cylindrical body. A nose portion is attached or integral with the upper end of the hollow cylindrical body and is configured for insertion in the neck region of the blank mold. A shoulder is defined between the nose portion and the hollow cylindrical body. One or more passages extend between the interior of the hollow cylindrical body and the shoulder. The nose portion has a hollow interior opening onto a valve seat at the upper end thereof. One or more passages extend between the interior of the hollow cylindrical body and the hollow interior of the nose portion. A guide bore extends between the interior of the hollow cylindrical body and the hollow interior of the nose portion. A valve stopper has a stem positioned within the bore such that in the valve's most downward position the valve stopper rests in the valve seat. A high temperature spring is coiled around the valve stem for urging the stopper away from the valve seat. A mechanism such as a snap ring is positioned at the lower end of the valve stem for restraining the maximum upward movement of the valve stem.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
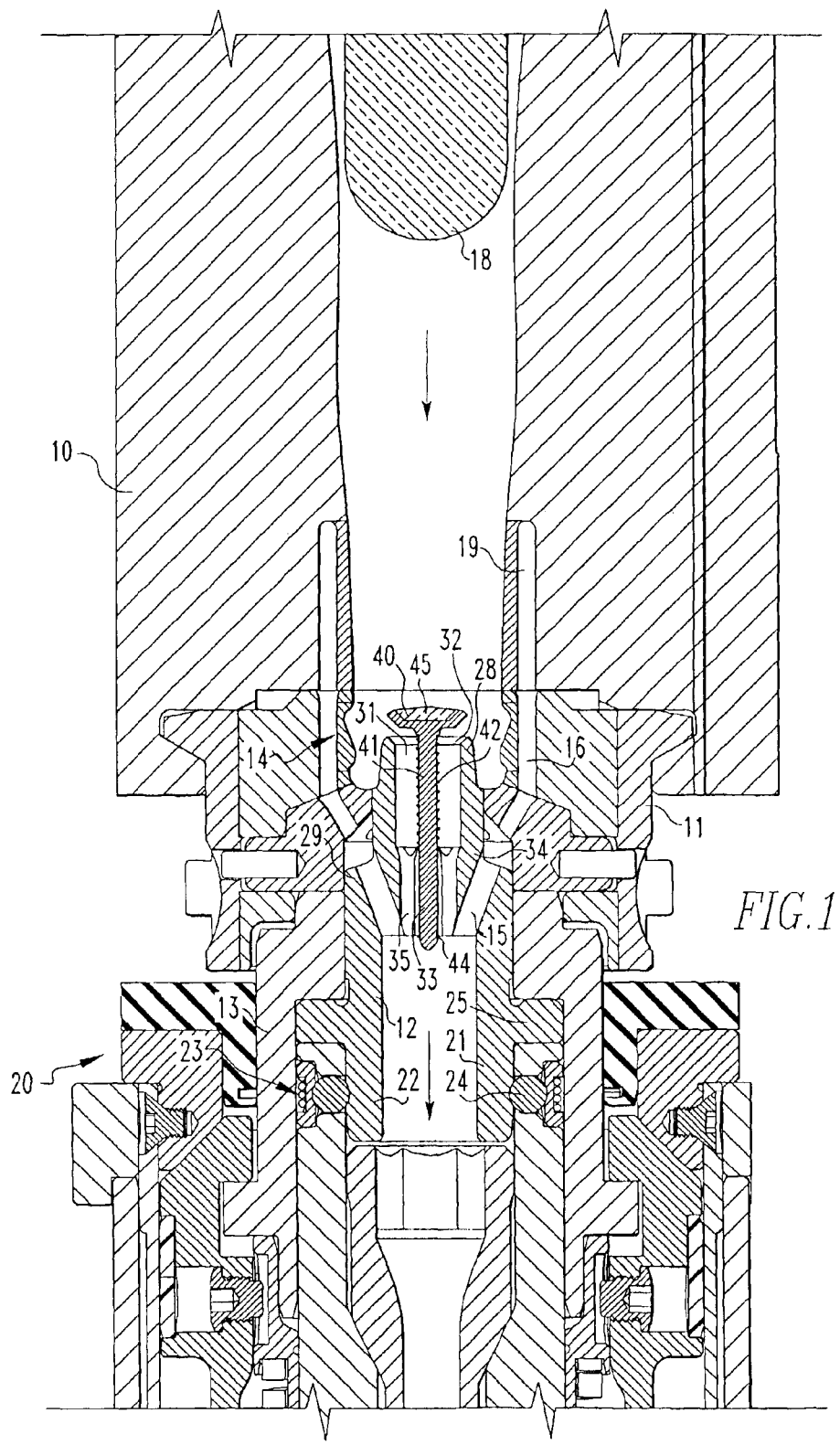
FIG. 1 is a section view of a portion of the plunger cylinder assembly, neck ring, and parison mold of an I.S. machine with the plunger in the full-up position prior to seating of the gob in the neck ring.

Directing attention to FIGS. 1 to 4, details of a plunger cylinder assembly are illustrated. A blank or parison mold 10 is positioned over a neck ring 11. A plunger cylinder assembly 20 moves a plunger 12 in and out of the opening in the neck ring 11. An element known in the art as a thimble 13 slides over the plunger 12 and moves up and down independently of the plunger 12 to abut the bottom of the neck ring 11 during certain stages of the parison forming process. The function of a plunger cylinder assembly is principally to position the plunger 12 and thimble 13 in one of three positions, namely, "full-up", "blow", and "full-down".

Referring to FIG. 1, the plunger 12 is placed in the full-up position wherein it enters the neck ring 11 for the formation of the neck of the parison as a gob of molten glass flows into the space between the neck ring 11 and the upper end or nose of the plunger 12. At this position, the thimble 13, which slides outside of the plunger 12, bears upon the underside of the neck ring 11. In this position, a vacuum is pulled through passages 15, 16, and 19 in the plunger 12, neck ring 11, and the lower end of the parison mold 10 to draw the gob into the neck and mold 10. The neck ring 11 often is configured to form threads on the exterior of the neck of the parison and container.

Figure 2:
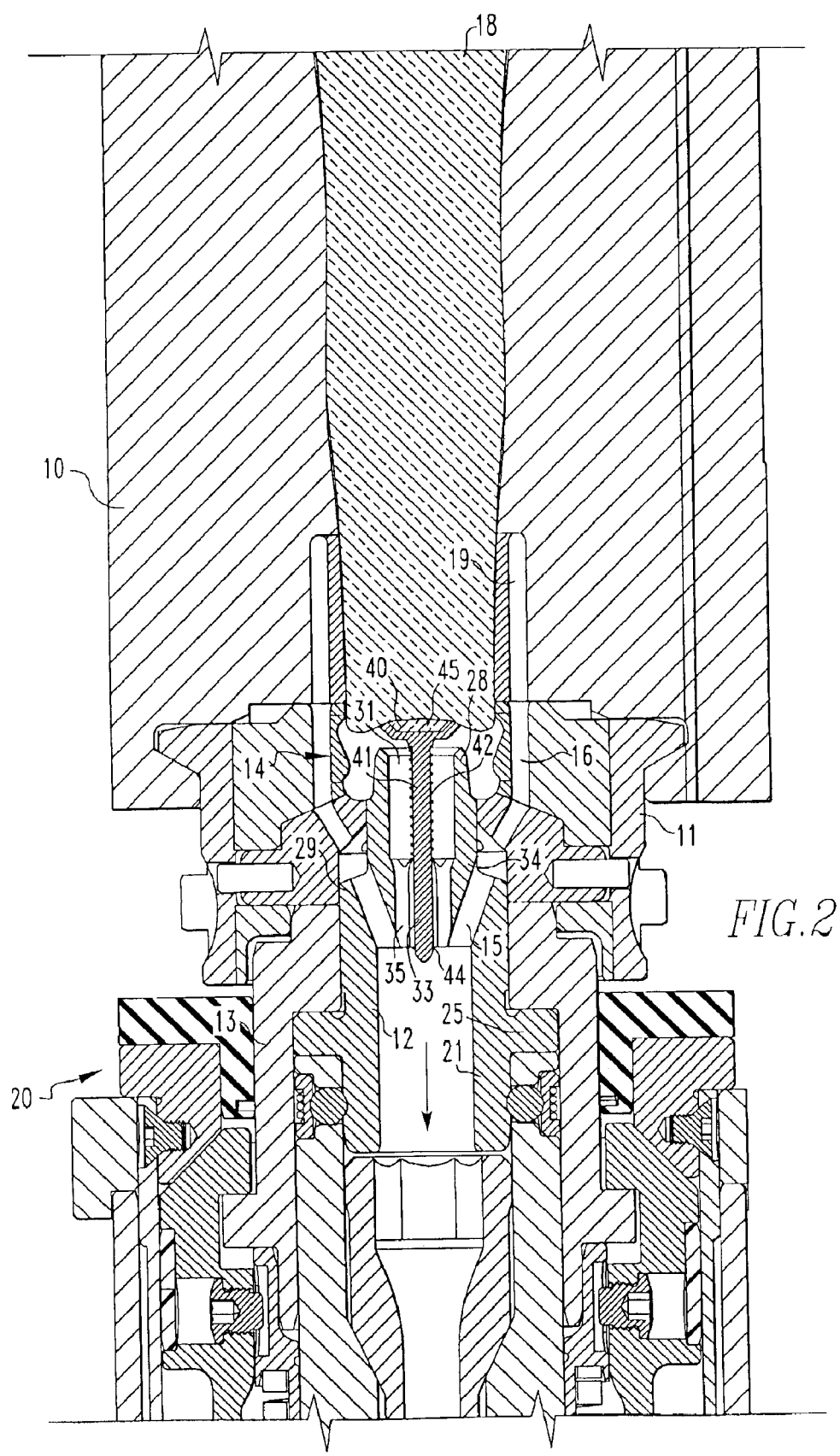
FIG. 2 is a section view similar to FIG. 1, with the plunger in the full-up position with the gob shown entering the neck region.
Figure 3:
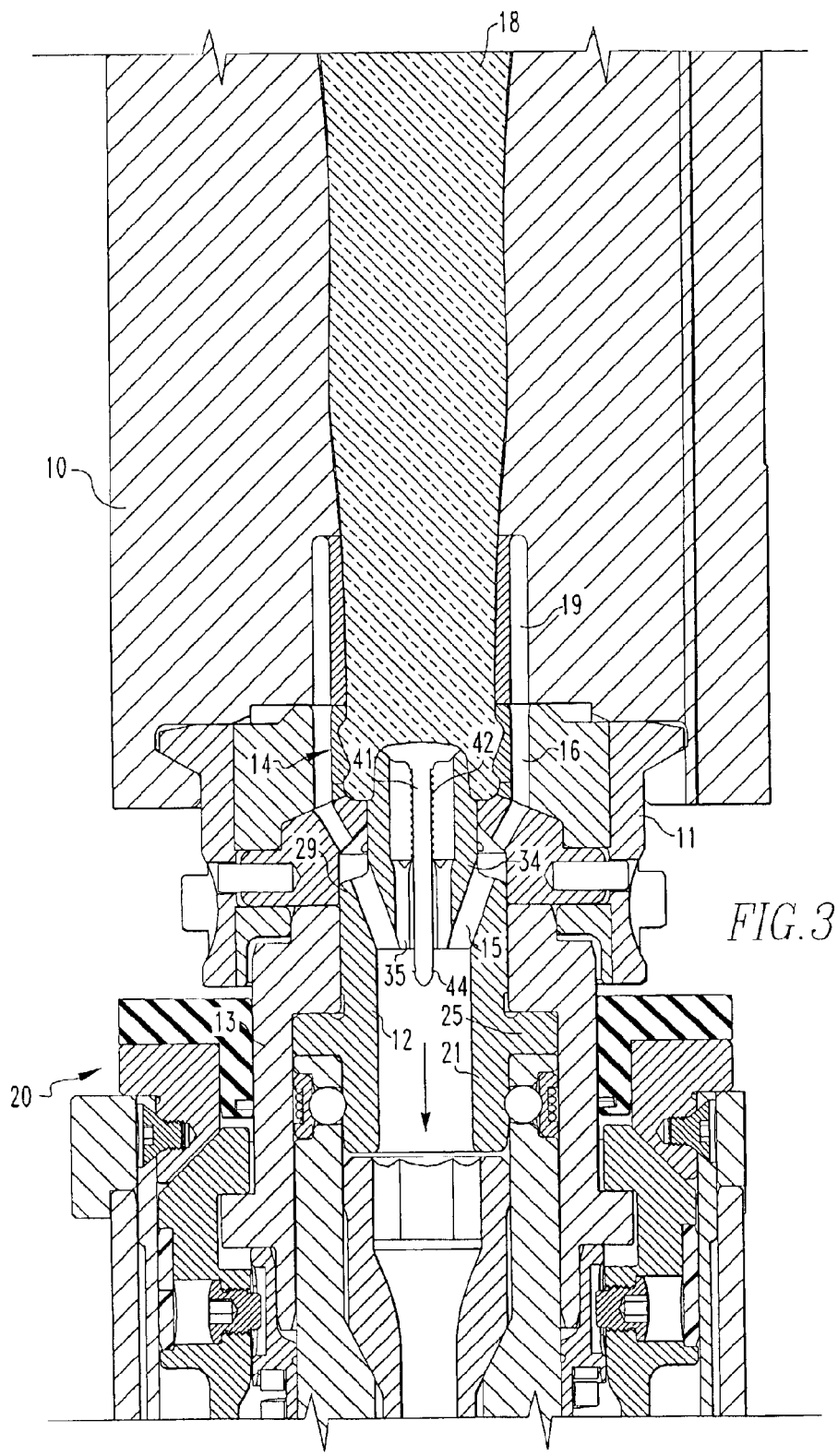
FIG. 3 is a section view similar to FIG. 1, with the plunger in the full-up position after seating of the gob in the neck ring.

Referring to FIG. 2, the plunger is shown in the full-up position and the gob has just reached the neck region and rests on the top surface of the valve head. The vacuum can still be drawn on the neck region. Referring to FIG. 3, the plunger remains in the full-up position and the gob has pushed the valve closed and has filled the neck region.

Figure 4:
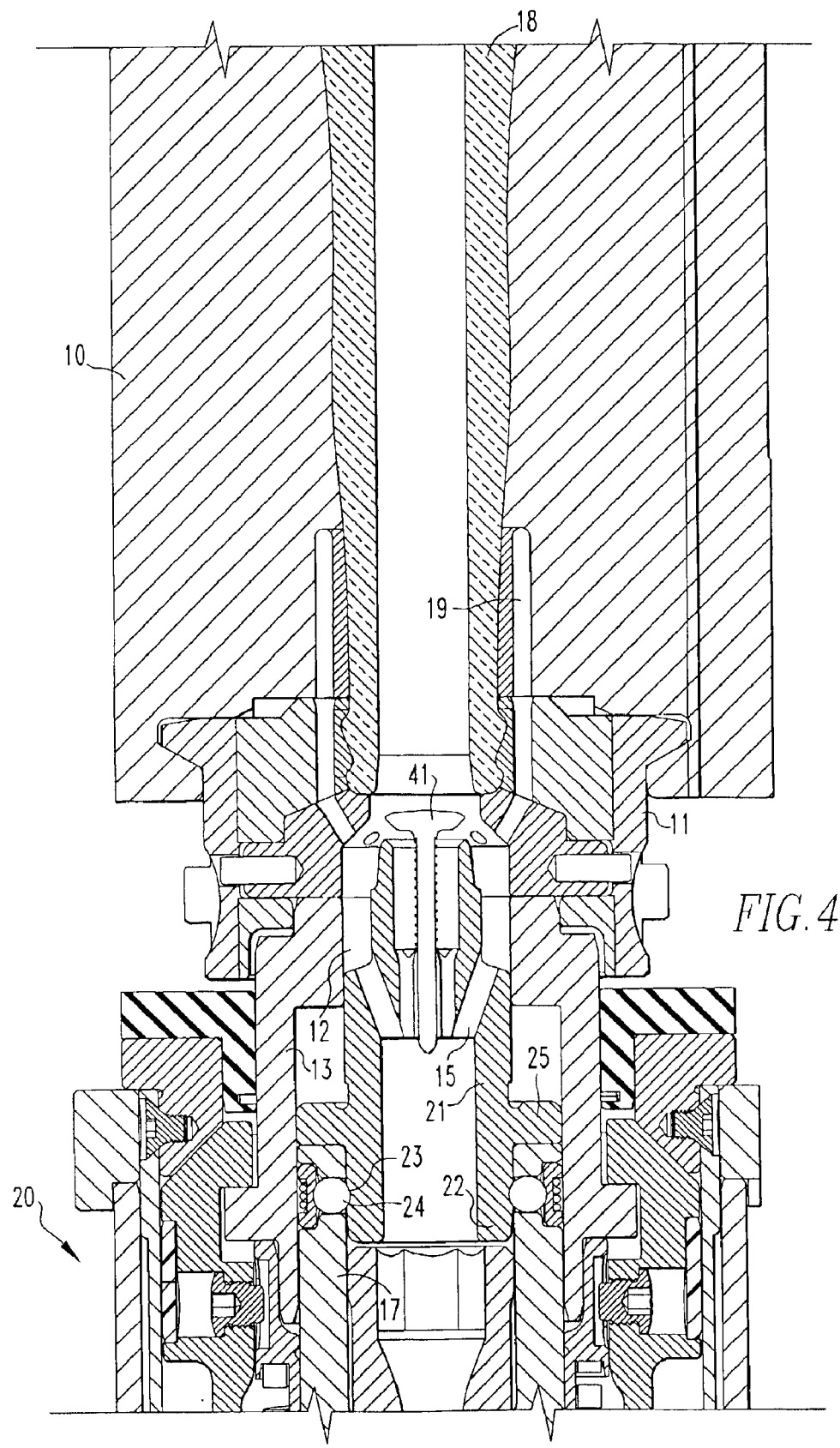
FIG. 4 is a section view similar to FIG. 2 with the plunger in the blow position.

Referring to FIG. 4, the plunger 12 is placed in the blow position wherein it is partially withdrawn from the neck ring leaving a space or bubble in the bottom of the gob into which air may be forced to blow the gob into contact with the walls of the mold forming the parision.

The plunger 12 may be positioned in the full-down or retracted position, wherein the plunger 12 is moved further away from the neck and the thimble 13 is pulled back away from the neck ring 11. In this position, after the mold has been separated from the neck ring 11, the formed parison can be carried away from the plunger cylinder by the neck ring 11 to the final container forming apparatus.

Of particular interest for the subject invention are the plunger 12 and the associated details. As previously discussed, the molten gob is introduced within the blank mold 10 to form a parison 18 which conforms to the mold within the neck region 14. The neck region 14 is comprised of the neck contour wall and the nose of the plunger 12.

As previously mentioned, a molten gob of glass may be urged within the blank mold 10 by a vacuum generated at the bottom of the blank mold. The arrangement is for drawing the molten gob into the blank mold utilizing a vacuum comprising passages 15 within the plunger 12, passages 16 within the neck region 14, and passages 19 within the blank mold 10. In particular, the plunger 12 has a hollow interior and passages extending therethrough whereby vacuum generated from below the plunger 12 is transferred to the mold. Mold passages 19 extend into the interior of the blank mold 10 while gaps produced by the outer diameter of the plunger 12 being smaller than the inner diameter at the base of the neck ring 11 thereby create a small gap around the perimeter of the plunger 12 to provide vacuum access. In prior art assemblies, the vacuum was only communicated with the interior of the blank mold by the above-described passages and gap.

The plunger 12, according to the present invention, comprises a hollow cylindrical body 21, the lower end 22 of which is provided with a structure 23 for attaching the plunger to a piston adapter 17. The adapter, in turn, is connected to the piston. Preferably and traditionally, the cylindrical body 21 has a circular section perpendicular to the axis thereof. Other cross sections, such as a regular polygon cross section, would be acceptable. As illustrated in the drawings, the structure 23 for attaching the plunger 12 to the piston 17 adapter is a groove for receiving balls 24 held in radial bores in the upper end of the piston 17. A suitable structure is described in detail in allowed U.S. patent application Ser. No. 09/713,724 entitled "Quick Change Connector for Plunger for Glass Container Forming Process and Equipment." Traditional connectors between the plunger and piston, such as removable clamps, are also suitable structures for attaching the plunger to the piston.

A radial flange 25 extends from the exterior of cylindrical body 21, preferably spaced from the lower end. The purpose of the flange is to engage the thimble 13 to limit the upward-most travel of the plunger relative to the thimble as shown in FIGS. 1 to 4.

A nose portion 28 attached to the upper end of the hollow cylindrical body 21 is configured for insertion in the neck region 14 of the neck ring 11. The length and configuration of the nose portion depends upon the configuration of the neck of the bottle being made. For example, a wine bottle requires a long neck to accept the full length of the cork. Bottles with threaded necks require a much shorter neck. Because the maximum diameter of the nose portion of the plunger where it joins the cylindrical body is less than the diameter of the cylindrical body, a shoulder 29 is defined between the nose portion and the hollow cylindrical body. Preferably and typically, the surface of the nose portion 28 is a surface of revolution that has an axis that is coaxial with the axis of the hollow cylindrical body 21. One or more passages 15 extend between the interior of the hollow cylindrical body 21 and the shoulder. Normally, at least four such passages are equally spaced around the cylindrical body. The nose portion has a hollow interior 31 opening onto a valve seat 32 at the upper end thereof. The valve seat 32 is tapered so as not to hold debris passed therethrough. The hollow interior 31 of the nose portion and the hollow interior of the cylindrical body 21 are separated by a wall 34 except for the passages and guide bore next described.

One or more passages 35 extend between the interior of the hollow cylindrical body and the hollow interior 31 of the nose portion. The purpose of these passages is to conduct the blown air or the seating vacuum to the neck region of the necking ring through the valve seat 32. Preferably, the upper ends of the passages 35 widen out in a funnel shape to ensure that when a vacuum is pulled through the valve seat, no debris drawn down from the mold will be captured in the hollow interior of the nose portion. Most preferably, the upper ends of the funnel-shaped entrances to the passages 35 overlap in a manner to eliminate any surface upon which debris can lodge.

A guide bore 33 extends between the interior of the hollow cylindrical body and the hollow interior of the nose portion. Preferably, the guide bore has an axis that is coaxial with the axis of the hollow cylindrical body 21 and the nose portion 28.

A valve stopper 40 has a tapered underside configured to rest snugly in the valve seat 32 at the upper end of the nose portion. A valve stem 41 attached to the valve stopper is positioned within guide bore 33 such that in its most downward position, the valve stopper rests in the valve seat and in its most upward position, the valve stem extends into the interior of the hollow cylindrical body. According to one embodiment, the upper surface of the valve stopper is coated with a material 45 having a heat-conductivity less than the metal from which the stopper and valve stem are formed. This reduced the length of the reheat period following withdrawal of the nose portion of the plunger and before the blow.

A high temperature spring 42, for example, made of Inconel, is coiled around the valve stem for urging the stopper away from the valve seat. At one end, the spring 42 abuts the underside of the stopper 40 and at the other end, it abuts the wall 34 separating the hollow interior of the nose portion from the hollow interior of the cylindrical body. The passages 35 direct a flow of air along the spring and valve stem during the blowing operation that serves to cool both the spring and the valve stem. An attachment on the lower end of the valve stem, such as a snap ring 44, restrains the maximum upward movement of the valve stem.

During the time a vacuum is being pulled to draw down the molten gob of glass, the spring causes the valve stopper to unseat as shown in FIG. 1. As the gob is drawn into the necking ring, it presses the valve closed as shown in FIG. 3. When the nose portion is withdrawn from the gob leaving a space or bubble, the valve is urged open again as shown in FIG. 4. Hence, the drawing of the vacuum does not simply depend upon the passages in the neck ring and the gap between the plunger and neck ring. Because of the speed with which the gob enters the blank mold and the rate at which the red-hot gob heats the air that it contacts, the gob has a tendency to be repelled as it enters the mold. This problem is overcome by the plunger as described herein. Moreover, the blowing of the parison to the blank mold walls is facilitated by the open valve.

Figure 5A:
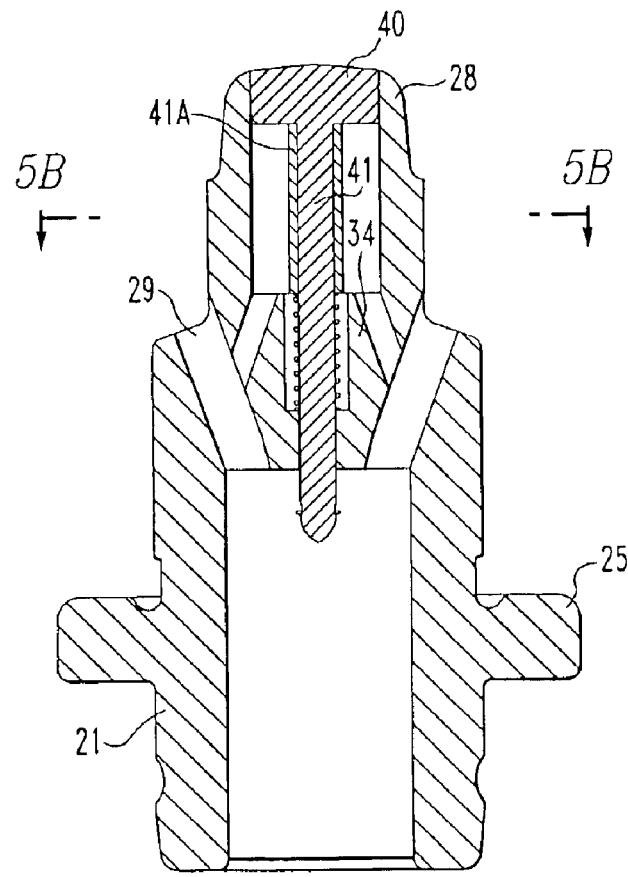
FIG. 5A is a section view of an alternate embodiment of the plunger.
Figure 5B:
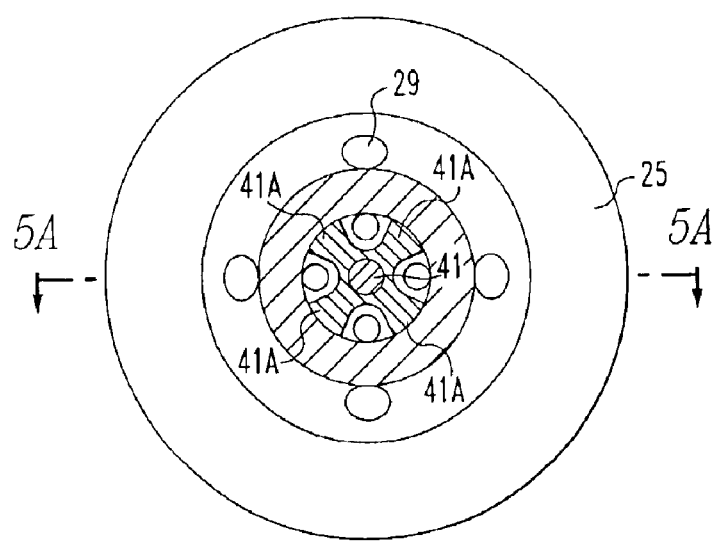
FIG. 5B is a section view taken along lines VA—VA of FIG. 5A.

Referring to FIG. 5A, an alternate embodiment of the plunger is shown in which the valve stopper has a cylindrical shape with a diameter just less than the diameter of the hollow interior opening of the nose portion so that the valve stopper can be withdrawn within the nose portion. The downward travel of the valve stopper is limited by the wings 41A extending from the valve stem, as illustrated in FIG. 5B, coming to rest upon the upper surface of wall 34. This embodiment is intended for especially narrow bottle necks.

Having thus described my invention in the detail and particularity required by the Patent Laws what is desired protected by Letters Patent is set forth in the following claims.

What is claimed is:

1. A plunger for being attached to a piston that inserts and withdraws the plunger from the neck region of a blank mold during the manufacture of a parison for forming glass containers in the blow-and-blow process comprises:

a hollow cylindrical body, the lower end of which defines means for attaching the plunger to the piston;

a radial flange extending from the exterior of the cylindrical body;

a nose portion attached to the upper end of the hollow cylindrical body configured for insertion in the neck region of the blank mold, there being a shoulder defined between the nose portion and the hollow cylindrical body;

one or more passages extending between the interior of the hollow cylindrical body and the shoulder;

the nose portion having a hollow interior opening at the upper end thereof;

one or more passages extending between the interior of the hollow cylindrical body and the hollow interior of the nose portion;

a guide bore extending between the interior of the hollow cylindrical body and the hollow interior of the nose portion;

a valve having a stem and a valve stopper, said valve stem positioned within said bore such that in its most downward position the valve stopper closes the hollow interior opening;

a temperature resistant spring coiled around the valve stem for urging the stopper away from the valve seat; and means for restraining the maximum upward movement of the valve stem.

2. The plunger according to claim 1, wherein the radial flange is spaced from the lower end of the plunger.

3. The plunger according to claim 1, wherein the surface of the nose portion is a surface of revolution.

4. The plunger according to claim 1, wherein the hollow cylindrical body is circular cylindrical.

5. The plunger according to claim 1, wherein the passages between the interior of the hollow cylindrical body and the hollow interior of the nose portion have a funnel shape at the upper ends thereof.

6. The plunger according to claim 1, wherein the spring coiled around the valve stem retains its resiliency at temperatures up to 1000 degrees F.

7. The plunger according to claim 6, wherein the spring is comprised of Inconel.

8. The plunger according to claim 1, wherein the upper surface of the valve stopper is coated with a lower heat conductivity material than the metal of the valve stopper and stem.

* * * * *